United States Patent
Watanabe et al.

(10) Patent No.: US 6,563,089 B2
(45) Date of Patent: May 13, 2003

(54) SILICON NITRIDE—TUNGSTEN CARBIDE COMPOSITE SINTERED MATERIAL, PRODUCTION PROCESS THEREFOR, AND GLOW PLUG COMPRISING THE SAME

(75) Inventors: Hiroki Watanabe, Gifu (JP); Katsura Matsubara, Aichi (JP); Masaya Ito, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/046,546

(22) Filed: Jan. 16, 2002

(65) Prior Publication Data
US 2002/0148823 A1 Oct. 17, 2002

(30) Foreign Application Priority Data
Jan. 17, 2001 (JP) ........................................ 2001-009019

(51) Int. Cl.[7] .................................................. F23Q 7/00
(52) U.S. Cl. ................... 219/270; 123/145 A; 501/97.4
(58) Field of Search ................................ 219/270, 544, 219/553; 123/145 A, 145 R; 361/264–266; 501/97.4

(56) References Cited

U.S. PATENT DOCUMENTS

| | | | |
|---|---|---|---|
| 5,178,647 A | | 1/1993 | Komatsu et al. |
| 5,750,958 A | * | 5/1998 | Okuda et al. ............... 219/267 |
| 5,804,523 A | | 9/1998 | Oda et al. |
| 6,423,944 B2 | * | 7/2002 | Watanabe et al. ........... 219/270 |
| 2001/0047989 A1 | * | 12/2001 | Watanabe et al. ........... 219/270 |
| 2002/0113052 A1 | * | 8/2002 | Watanabe et al. ........... 219/270 |

FOREIGN PATENT DOCUMENTS

| | | | |
|---|---|---|---|
| EP | 288 696 A1 | | 11/1988 |
| EP | 834 652 A1 | | 4/1998 |
| JP | 55-51766 | * | 4/1980 |
| JP | 58-49670 | * | 3/1983 |
| JP | 62-44554 | * | 2/1987 |
| JP | 2-75188 | * | 3/1990 |
| JP | 2-157112 | * | 6/1990 |
| JP | 8-45648 | | 2/1996 |
| JP | 8-64346 A | | 3/1996 |
| JP | 9-14659 | * | 1/1997 |
| JP | 9-137945 | * | 5/1997 |
| JP | 10-50460 | | 2/1998 |
| JP | 11-214124 | | 8/1999 |

* cited by examiner

Primary Examiner—John A. Jeffery
(74) Attorney, Agent, or Firm—Sughrue Mion, PLLC

(57) ABSTRACT

A silicon nitride-tungsten carbide composite sintered material which contains silicon nitride and tungsten carbide, and characterized in that in an arbitrary cross-section of the sintered material, the ratio of the area of a tungsten carbide portion to that of the entirety of the cross-section is 20–35%, and a tungsten carbide aggregation portion having a longitudinal length of at least 5 $\mu$m is present in the arbitrary cross-section. The production process includes firing raw material powder containing tungsten carbide powder and two silicon nitride powders having different particle sizes.

10 Claims, 1 Drawing Sheet

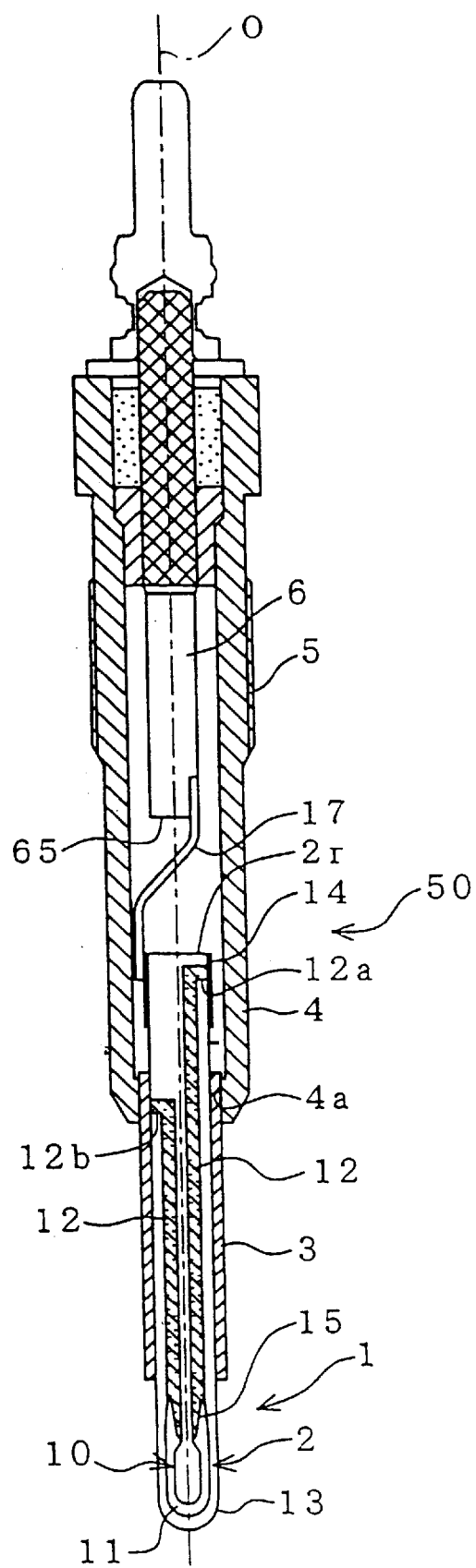

SILICON NITRIDE— TUNGSTEN CARBIDE COMPOSITE SINTERED MATERIAL, PRODUCTION PROCESS THEREFOR, AND GLOW PLUG COMPRISING THE SAME

BACKGROUND OF THE INVENTION

1. Field of the Invention

The present invention relates to a silicon nitride-tungsten carbide composite sintered material and to a process for producing the sintered material; and more particularly to a silicon nitride-tungsten carbide composite sintered material exhibiting well-balanced properties in terms of specific resistance and thermal expansion coefficient while maintaining specific resistance at a low level, and to a process for producing the sintered material. The silicon nitride-tungsten carbide composite sintered material of the present invention is used as, for example, a material for a heater of a glow plug.

2. Description of the Related Art

Conventionally, silicon nitride-tungsten carbide composite sintered material is used as, for example, a material for a heater of a glow plug, since electrical resistance of the sintered material can be controlled easily. In order to attain intended characteristics through control of electrical resistance, for example, as disclosed in Japanese Patent Application Laid-Open (kokai) No. 8-64346, the amount of added tungsten carbide, which serves as a conductive substance, in a sintered material, and the amount of added silicon nitride, which serves as an insulating substance, in the sintered material are regulated.

A heating element of a glow plug has a structure including a heater which is formed from silicon nitride-tungsten carbide composite sintered material, a silicon nitride ceramic support section for embedding the heater therein, and a lead wire section formed from a high-melting-point metal. An important factor for the formation of this element structure is balancing in thermal expansion coefficient between the materials of the heater, the support, and the lead wire. Great mismatch between the thermal expansion coefficients of the materials raises problems, including generation of cracking during firing, lowering of strength of the resultant sintered element, and deterioration of durability of the element under application of electricity. Therefore, regulation of the thermal expansion coefficient of the material of the heater is also important.

The thermal expansion coefficient of the material of the heater is greatly affected by the incorporation amount of conductive tungsten carbide. Therefore, depending on the incorporation amount of tungsten carbide, the thermal expansion coefficient and specific resistance of the material are determined substantially uniquely. However, in order to reduce power consumption of the heater, the specific resistance must be reduced for a given thermal expansion coefficient.

SUMMARY OF THE INVENTION

An object of the present invention is to provide a silicon nitride-tungsten carbide composite sintered material exhibiting well-balanced properties in terms of specific resistance and thermal expansion coefficient while maintaining specific resistance at a low level; and a process for producing the sintered material.

In view of the foregoing, the present inventors have performed extensive studies on developing a silicon nitride-tungsten carbide composite sintered material exhibiting well-balanced properties in terms of specific resistance and thermal expansion coefficient while maintaining specific resistance at a low level, as well as on a process for producing the sintered material; and have accomplished the present invention on the basis of the studies.

The present invention provides a silicon nitride-tungsten carbide composite sintered material comprising silicon nitride and tungsten carbide, characterized in that, in an arbitrary cross-section of the sintered material, the ratio of the area of a tungsten carbide portion to that of the entirety of the cross-section is 20–30%; and a tungsten carbide aggregation portion having a longitudinal length of at least 5 $\mu$m is present in the arbitrary cross-section.

No particular limitation is imposed on the silicon nitride incorporated into the silicon nitride-tungsten carbide composite sintered material of the present invention, and the silicon nitride may be of two or more grain types of different sizes. When the total amount of silicon nitride and tungsten carbide is 100 mass %, the incorporation amount of silicon nitride is preferably 33–38 mass %. When the amount of silicon nitride is less than 33 mass %, the amount of tungsten carbide becomes large, resulting in an increase in thermal expansion coefficient, whereas when the amount of silicon nitride exceeds 38 mass %, the specific resistance of the composite sintered material increases, which is not preferable.

The silicon nitride-tungsten carbide composite sintered material of the present invention may contain an oxide of a rare earth element. The "rare earth element" which constitutes the oxide is one or more elements selected from among, for example, Y, Sc, La, Ce, Pr, Nd, Gd, Tb, Dy, Er, and Yb.

Intergrain regions of the silicon nitride-tungsten carbide composite sintered material of the present invention may contain a crystalline phase in addition to an amorphous phase of, for example, rare earth elements, silicon, oxygen, and/or nitrogen. When such a crystalline phase is present in the intergrain regions, softening of grain boundary phase at high temperature is prevented, and mechanical characteristics of the sintered material at high temperature can be enhanced. Examples of the crystalline phase include $RE_2Si_2O_7$ and $RE_2SiO_5$ (RE=rare earth element). The crystalline phase may contain one or more of such species.

In an arbitrary cross-section of the aforementioned composite sintered material, the ratio of the area of a tungsten carbide portion to that of the entirety of the cross-section is obtained as described below. Specifically, the composite sintered material is cut along a hot pressing direction so as to obtain an arbitrary cross-section (i.e., a cross-section to be observed), and the cross-section is subjected to, for example, surface grinding and mirror polishing. A certain region of the resultant cross-section is observed at a magnification of 2,000, and the ratio of the area of a region at which W detection sensitivity is high to the area of the entirety of the observed region is calculated by use of an electron probe micro-analyzer.

The ratio of the area of the tungsten carbide portion is preferably 25–28%. When the ratio of the area is less than 20%, specific resistance increases, whereas when the ratio of the area exceeds 30%, specific resistance decreases, which is not preferable.

The longitudinal length of a tungsten carbide aggregation portion in the aforementioned arbitrary cross-section is obtained by measuring the longitudinal length of a portion in which tungsten carbide grains are linked together, on the basis of the reflection electron image of the cross-section as taken by use of a scanning electron microscope.

The aforementioned longitudinal length is preferably 8 µm or more. When the length is less than 5 µm, specific resistance increases, which is not preferable.

The silicon nitride-tungsten carbide composite sintered material of the present invention has a specific resistance of 10,000 µΩ·cm or less, preferably 8,000 µΩ·cm or less, more preferably 6,000 µΩ·cm or less, and has a thermal expansion coefficient of 3.6–4.2 ppm/° C., preferably 3.7–4.2 ppm/° C., more preferably 3.7–4.1 ppm/° C., between room temperature and 1,000° C.

When the aforementioned specific resistance exceeds 10,000 µΩ·cm, conductivity is lowered, and the voltage required for heat generation increases, which is not preferable. When the aforementioned thermal expansion coefficient is less than 3.6 ppm/° C., the difference between the thermal expansion coefficient of the sintered material and that of a lead wire formed from a high-melting-point metal (4.8 ppm/° C.) becomes large, whereas when the thermal expansion coefficient exceeds 4.2 ppm/° C., the difference between the thermal expansion coefficient of the sintered material and that of insulating ceramic (3.6–3.8 ppm/° C.) becomes large, resulting in generation of cracking in a heating element and deterioration of durability of the element under application of electricity, which is not preferable.

The present invention also provides a process for producing a silicon nitride-tungsten carbide composite sintered material, comprising firing raw material powder containing tungsten carbide powder and two silicon nitride powders having different particle sizes.

The aforementioned silicon nitride powder may contain powder (A) having a particle size of preferably less than 0.7 µm, more preferably 0.3–0.7 µm, much more preferably 0.4–0.6 µm, and powder (B) having a particle size of preferably at least 0.7 µm, more preferably 0.7–1.5 µm, much more preferably 0.8–1.2 µm.

No particular limitation is imposed on the incorporation ratio of these powders. However, when the total amount of powder (A) and powder (B) is 100 mass %, the amount of powder (A) is preferably 40–70 mass %, more preferably 50–65 mass %, much more preferably 52.6–60.6 mass %, and the amount of powder (B) is preferably 30–60 mass %, more preferably 35–50 mass %, much more preferably 39.4–47.4 mass %. When the amount of powder (A) is less than 40 mass % and the amount of powder (B) exceeds 60 mass %, sinterability is lowered, whereas when the amount of powder (A) exceeds 70 mass % and the amount of powder (B) is less than 30 mass %, the specific resistance of a composite sintered material increases, which is not preferable.

The specific resistance of a composite sintered material is determined by the incorporation ratio of tungsten carbide, which is a conductive substance, and silicon nitride, which is an insulating substance. However, in the case where a certain limitation is imposed on the thermal expansion coefficient, which is an important factor when the composite sintered material is to be used as a material for a heater, the incorporation amount of tungsten carbide can no longer be varied. In this case, when silicon nitride powder having a large average particle size (e.g., 0.7 µm or more) is incorporated in combination with silicon nitride powder having a smaller particle size, the specific surface area of grains of silicon nitride, which is an insulating substance, can be reduced, causing tungsten carbide grains to be present continuously in the sintered material, leading to low specific resistance of the material.

According to the process for producing a silicon nitride-tungsten carbide composite sintered material of the present invention, a composite sintered material can be produced having a specific resistance of 10,000 µΩ·cm or less, preferably 8,000 µΩ·cm or less, more preferably 6,000 µΩ·cm or less, and having a thermal expansion coefficient of 3.6–4.2 ppm/° C., preferably 3.7–4.2 ppm/° C., more preferably 3.7–4.1 ppm/° C., between room temperature and 1,000° C.

A further aspect of the present invention provides a glow plug comprising a ceramic resistor formed at least partly of the silicon nitride-tungsten carbide composite sintered material described above.

BRIEF DESCRIPTION OF THE DRAWINGS

The FIGURE illustrates, in cross-section, a glow plug according to one embodiment of the invention.

DESCRIPTION OF THE PREFERRED EMBODIMENTS

The present invention will next be described in detail by way of Examples and Comparative Examples. However, the present invention should not be construed as being limited thereto.

(1) Preparation of Composite Sintered Material

Silicon nitride powder (average particle size: 0.5 µm and 1.0 µm), tungsten carbide powder (average particle size: 0.6–1.0 µm), powder of an oxide of a rare earth element ($Y_2O_3$, $Er_2O_3$, or $Yb_2O_3$ [average particle size: 1.0–3.0 µm]), and $SiO_2$ powder (average particle size: 0.6 µm), serving as raw materials, were mixed so as to attain a formulation shown in Table 1. The proportions of the constituents in mass % are based on the total amount of silicon nitride plus tungsten carbide representing 100 mass %, rather than the total of all constituents being 100 mass %. Subsequently, the resultant powder mixture was wet-mixed in pure water for 40 hours by use of grinding balls formed from silicon nitride, and then dried using a hot water bath. Thereafter, the resultant powder mixture was fired for one hour through hot pressing in a nitrogen atmosphere at 1,800° C. and 25 MPa, to thereby yield a sintered material having dimensions of 45 mm×45 mm×5 mm (sintered materials Nos. 1 through 14).

TABLE 1

| | Sample No. | $Si_3N_4$ (mass %) 0.5 µm | $Si_3N_4$ (mass %) 1.0 µm | WC (mass %) | $RE_2O_3$ | $RE_2O_3$ (mass %) | $SiO_2$ (mass %) |
|---|---|---|---|---|---|---|---|
| Ex. | 1 | 20 | 13 | 67 | $Y_2O_3$ | 8 | 1.5 |
| | 2 | 20 | 13 | 67 | $Er_2O_3$ | 12 | 1.0 |
| | 3 | 20 | 15 | 65 | $Yb_2O_3$ | 10 | 1.0 |
| | 4 | 20 | 15 | 65 | $Y_2O_3$ | 6 | 1.0 |
| | 5 | 20 | 18 | 62 | $Er_2O_3$ | 10 | 2.0 |
| Comp. Ex. | 6 | 20 | 20 | 60 | $Yb_2O_3$ | 8 | 1.5 |
| | 7 | 20 | 23 | 57 | $Y_2O_3$ | 8 | 1.0 |
| | 8 | 20 | 24 | 55 | $Yb_2O_3$ | 8 | 1.5 |
| | 9 | 15 | 20 | 65 | $Er_2O_3$ | 10 | 1.0 |
| | 10 | 25 | 10 | 65 | $Y_2O_3$ | 8 | 2.0 |
| | 11 | 30 | 5 | 65 | $Yb_2O_3$ | 8 | 1.5 |
| | 12 | 35 | 0 | 65 | $Yb_2O_3$ | 8 | 1.5 |
| | 13 | 0 | 35 | 65 | $Er_2O_3$ | 10 | 1.0 |
| | 14 | 5 | 25 | 70 | $Er_2O_3$ | 8 | 1.5 |

(2) Evaluation of Composite Sintered Material

Each of the sintered materials Nos. 1 through 14 was subjected to measurement (i) relative density, (ii) specific resistance, (iii) thermal expansion coefficient between room temperature and 1,000° C., (iv) ratio of the area of a carbide (WC) portion in an arbitrary cross-section, and (v) longitudinal length of a WC aggregation portion in an arbitrary cross-section. The results shown in Table 2. In order to obtain (i) relative density, the density of the sintered material was measured by means of Archimedes'principle, and the ratio of the resultant density to the theoretical density calculated by means of the law of mixing was calculated. In order to obtain (ii) specific resistance, the sintered material was formed into a test piece having dimensions of 3 mm×4 mm×15 mm, and the resistance of the test piece was measured by applying measurement terminals of a milli-ohm meter to both ends of the test piece at 25° C. The specific resistance was calculated on the basis of the thus-measured resistance by means of the following formula.

Specific resistance=(resistance [$\mu\Omega$]×cross-sectional area of sample [$cm^2$])/(sample length [cm])

(iii) Thermal expansion coefficient was measured by increasing the temperature of a sample (dimensions: 4 mm×3 mm×15 mm) from 30° C. to 1,000° C. at a rate of 10° C./min in a nitrogen atmosphere by use of Thermoplus TMA8310 (product of Rigaku). Alumina having a length at 30° C. equal to that of the sample to be measured at 30° C. and having a thermal expansion coefficient of 8.45 ppm/° C. at 1,000° C. was used as a standard sample. When the length of the standard sample at 1,000° C. is represented by "A," the length of the sample to be measured at 1,000° C. is represented by "B," and the length of the sample to be measured at 30° C. is represented by "C," the thermal expansion coefficient ox of the sample to be measured was obtained by means of the following formula.

$\alpha = 8.45 \times 10^{-6} - (A-B)/\{C \times (1,000-30)\}$ (iv) Ratio of area of WC portion The cross-section of the sintered material was subjected to mirror polishing by use of a mirror polishing apparatus. The resultant cross-section was analyzed in a visual field at a magnification of 2,000 by use of an electron probe micro-analyzer JXA8800M (product of JEOL Ltd.), and the ratio of the area of a region at which W detection sensitivity was high to that of the entire visual field was calculated.

(v) The longitudinal length of a WC aggregation portion was obtained as follows: the reflection electron image of the sample obtained in (iv) was taken by use of a scanning electron microscope JSM840 (product of JEOL Ltd.) at a magnification of 5,000 under application of an acceleration voltage of 20 kV, and the longitudinal length of a portion in which tungsten carbide grains are linked together was measured.

TABLE 2

|  | Sample No. | Relative density (%) | Ratio of area of WC portion (%) | Longitudinal length of WC aggregation portion ($\mu$m) | Specific resistance ($\mu\Omega \cdot$ cm) | Thermal expansion coefficient (ppm/° C.) |
| --- | --- | --- | --- | --- | --- | --- |
| Example | 1 | 99 | 25 | 14 | 4800 | 4.1 |
|  | 2 | 100 | 26 | 13 | 4200 | 4.0 |
|  | 3 | 100 | 23 | 8 | 6500 | 3.9 |
|  | 4 | 99 | 24 | 7 | 7200 | 3.7 |
|  | 5 | 100 | 21 | 5 | 9500 | 3.7 |
| Comparative Example | 6 | 99 | 19 | 5 | 21500 | 3.6 |
|  | 7 | 99 | 17 | 6 | 38000 | 3.5 |
|  | 8 | 100 | 15 | 4 | 55000 | 3.3 |
|  | 9 | 96 | 19 | 5 | 75000 | 3.4 |
|  | 10 | 100 | 19 | 6 | 41000 | 3.6 |
|  | 11 | 100 | 18 | 6 | 69000 | 3.6 |
|  | 12 | 100 | 18 | 2 | 125000 | 3.5 |
|  | 13 | 89 | 17 | 3 | 96000 | 2.9 |
|  | 14 | 92 | 32 | 8 | 58000 | 3.1 |

(3) Effects Exerted by Working Examples

As is apparent from Table 2, in the sintered materials Nos. 6 through 13, the WC content is low; i.e., the ratio of the area of a WC portion is less than 20%, and the specific resistance exceeds 20,000 $\mu\Omega$·cm. Particularly in the sintered material No. 12, the longitudinal length of a tungsten carbide aggregation portion is as small as 2 $\mu$m, specific resistance is considerably high, and thermal expansion coefficient is high. In the sintered material No. 14, the ratio of the area of a WC portion is higher than 30%, sinterability is lowered, specific resistance is high, and thermal expansion coefficient is low.

In contrast, in the sintered materials Nos. 1 through 5, the ratio of the area of a WC portion and the longitudinal length of a tungsten carbide aggregation portion fall within the ranges of the present invention, specific resistance is low, and thermal expansion coefficient is 3.7–4.1 ppm/° C. Therefore, the thermal expansion coefficient of the sintered material (i.e., a material for a heater) is well-balanced with those of a material for a support and a lead wire portion.

The figure shows an example of a glow plug according to a further embodiment of the present invention in which the construction of an inner portion thereof is illustrated. The glow plug 50 has a ceramic heater 1 and an outer metal cylinder 3 retaining the same, and a main metal member 4 joined to the metal cylinder. The ceramic heater 1 has a shape of a rod, and a resistance heating element 11 is buried in a front end portion 2 thereof. A first heater terminal 12a for supplying current to the resistance heating element 11 is formed in an exposed state on an outer circumferential surface of a rear end portion of the heating element. The outer metal cylinder 3 is formed tubularly, and holds the ceramic heater 1 on an inner side thereof so that a rear end portion and a front end portion 2 thereof project from the metal cylinder in the axial direction O thereof The main metal member 4 is formed tubularly so as to be joined coaxially to the outer metal cylinder 3.

The main metal member 4 is provided on an outer circumferential surface thereof with a threaded portion 5 as a fixing portion for securing the glow plug 50 to an engine block (not shown), and a metal shaft 6 is fixed to a rear end portion of the main metal member. The metal shaft 6 is formed in the shape of a rod, and inserted into an inner side of the rear end portion of the main metal member 4 in the axial direction O. The metal shaft 6 is disposed so that a front end surface 6s thereof is opposed in the axial direction O to a rear end surface 2r of the ceramic heater 1. A metal terminal ring 14 electrically connected to the first heater terminal 12a is fixed in a close fitted state on an outer circumferential surface of a rear end portion of the ceramic heater 1 so as to cover the first heater element 12a. The metal shaft 6 and first heater terminal 12a are electrically connected via a metal lead member 17 joined at one end thereof to the terminal ring 14, and at the other end thereof to the metal shaft 6. Since the metal lead member 17 is fixed to the terminal ring 14 by a metal/metal connection, a complicated structure requiring much processing, such as a metal/ceramic material soldered structure, and a structure in which the metal lead member 17 is connected to the ceramic heater 1 by burying the former in the latter, is eliminated. This enables the glow plug to be manufactured at a lower cost. Since the terminal ring 14 is fitted on the ceramic heater 1 by close fitting, a solder layer such as that formed in a related art structure is not interposed therebetween. As a result, a concentricity of the metal shaft 6 and terminal ring 14 is secured easily. Owing to such a structure, the joint surfaces of the metal lead member 17 and metal shaft 6 or terminal ring 14 tend not to slip. In turn, a joint portion of good quality and high strength can be formed.

A second heater terminal 12b for supplying current to the resistance heating element 11 is formed in an exposed state on the portion of the outer circumferential surface of the ceramic heater 1 which is ahead of the first heater terminal 12a in the axial direction O. The tubular metal cylinder 3 a covering and electrically connected to the second heater terminal 12b is fixed in a close fitted state on an outer circumferential surface of the ceramic heater 1 with a rear end portion of the ceramic heater 1 projected in the rearward direction thereof. The main metal member 4 is fixed at a cylindrical heater holding surface 4a thereof to the outer circumferential surface of the outer metal cylinder 3.

Owing to this structure, the outer metal cylinder 3 and terminal ring 14 are fixed in a close fitted state on both of the two heater terminals 12a, 12b used to supply current to the ceramic heater 1. The assembled structure of the glow plug is thereby further simplified.

The second heater terminal 12b is disposed ahead of the first heater terminal 12a in the axial direction O and the outer metal cylinder 3 is used also as a terminal ring with the main metal member 4 fixed to the outer metal cylinder 3. According to this structure, the outer metal cylinder 3 is used also as a terminal ring. This enables the number of parts to be reduced, and the glow plug according to the present invention to be provided at a lower cost.

The main metal member 4 is fixed to the outer surface of the outer metal cylinder 3 to be exact. According to this arrangement, the outer metal cylinder 3 interposed between the main metal member 4 and ceramic heater 1 is used as a spacer, so that a suitable clearance width can be formed between the outer circumferential surface of a rear end portion of the ceramic heater 1 projected rearward from the outer metal cylinder 3 and the portion of the inner circumferential surface of the main metal member 4 which is on the rear side of the heater holding surface 4a thereof. This makes it easier to provide the terminal ring 14 on the rear end portion of the ceramic heater 1.

The ceramic heater 1 is formed as a rod type ceramic heater element in which a ceramic resistor 10 is buried in a ceramic base member 13 formed of an insulating ceramic material. In this mode of embodiment, the ceramic resistor 10 is formed of a conductive ceramic material that is the silicon nitride-tungsten carbide composite sintered material as described previously according to the invention. This ceramic resistor portion 10 has a U-shaped first ceramic resistor portion 11 functioning as a resistance heating element embedded in a front end portion of the ceramic heater 1 and has two second ceramic resistor portions 12, 12 extending in the axial direction O and embedded in a rear end portion of the ceramic heater 1. Each of the second resistor portions 12, 12 is joined to an end of the U shaped first resistor at a joining interface 15. The electrical resistivity of the first resistor portion 11 is made lower than that of the second ceramic resistor portions 12, 12 by changing the composition of the composite sintered material. As a result, the front end portion of the ceramic heater 1 has an elevated temperature higher than the rear portion of the heater 1 when an electrical current flows through the heater. The two second resistor portions 12, 12 of the ceramic resistor 10 have branching sections formed at mutually different heights in the axial direction O. The parts of these branching sections which are exposed to the surface of the ceramic heater form the first heater terminal 12a and second heater terminal 12b, respectively.

In this embodiment, at least one of the first and said second conductive ceramic materials comprises the silicon nitride-tungsten carbide composite sintered material of the present invention as described above.

In this mode of embodiment, a silicon nitride ceramic material is employed as an insulating ceramic material constituting the ceramic base member 13. The texture of the silicon nitride ceramic material is formed by combining main phase particles, which contain silicon nitride ($Si_3N_4$) as a main component, with one another by a grain boundary phase derived from a sintering aid and the like. The main phase may be a phase in which Al or O is substituted for a part of Si or N, or, furthermore, a phase in which atoms of metals, such as Li, Ca, Mg, Y, etc., are dissolved in solid solution.

The present invention is not limited to the aforementioned Examples, and various modifications may be made in accordance with purposes and uses.

In the silicon nitride-tungsten carbide composite sintered material of the present invention, in an arbitrary cross-section of the sintered material, the ratio of the area of a tungsten carbide portion to that of the entirety of the cross-section is 20–30%; and a tungsten carbide aggregation portion having a longitudinal length of at least 5 $\mu$m is present in the arbitrary cross-section. Therefore, the sintered material exhibits well-balanced properties in terms of specific resistance and thermal expansion coefficient while maintaining specific resistance at a low level.

According to the process for producing a silicon nitride-tungsten carbide composite sintered material of the present invention, a silicon nitride-tungsten carbide composite sintered material is provided which satisfies both low specific resistance and appropriate thermal expansion coefficient, which are required for a material of a heater of a glow plug.

It should further be apparent to those skilled in the art that various changes in form and detail of the invention as shown and described above may be made. It is intended that such changes be included within the spirit and scope of the claims appended hereto.

This application is based on Japanese Patent Application No. 2001-9019 filed Jan. 17, 2001, the disclosure of which is incorporated herein by reference in its entirety.

What is claimed is:

1. A silicon nitride-tungsten carbide composite sintered material comprising silicon nitride and tungsten carbide, characterized in that, in an arbitrary cross-section of the sintered material, the ratio of the area of a tungsten carbide portion to that of the entirety of the cross-section is 20–30%; and a tungsten carbide aggregation portion having a longitudinal length of at least 5 $\mu$m is present in the arbitrary cross-section.

2. The silicon nitride-tungsten carbide composite sintered material as claimed in claim 1, wherein a crystalline phase is present in an intergrain region of the sintered material.

3. The silicon nitride-tungsten carbide composite sintered material as claimed in claim 2, wherein said crystalline phase comprises at least one of $RE_2Si_2O_7$ and $RE_2SiO_5$ where RE is a rare earth element.

4. The silicon nitride-tungsten carbide composite sintered material as claimed in claim 1, wherein the silicon nitride is of two or more grain types of different sizes.

5. The silicon nitride-tungsten carbide composite sintered material as claimed in claim 1, which has a thermal expansion coefficient in the range of from 3.6 to 4.2 ppm/° C. between room temperature and 1,000° C., and a specific resistance of 10,000 $\mu\Omega$·cm or less.

6. The silicon nitride-tungsten carbide composite sintered material as claimed in claim 1, wherein the amount of silicon nitride is in the range of from 33 to 38% by mass of the total mass of silicon nitride plus tungsten carbide.

7. A glow plug comprising a ceramic resistor formed at least partly of the silicon nitride-tungsten carbide composite sintered material as claimed in claim 1.

8. A process for producing a silicon nitride-tungsten carbide composite sintered material as claimed in claim 1, comprising:

firing raw material powder containing tungsten carbide powder and two silicon nitride powders having different particle sizes.

9. The process as claimed in claim 8, wherein said two silicon nitride powders comprise a first powder having a particle size less than 0.7 $\mu$m, and a second powder having a particle size of at least 0.7 $\mu$m.

10. The process as claimed in claim 9, wherein said two silicon nitride powders are present in a ratio by mass of the first powder to the second powder in the range of from 40:60 to 70:30.

* * * * *